May 17, 1949.    G. F. HADDICAN    2,470,308
FITTING FOR FIBER PIPES
Filed Jan. 3, 1947

INVENTOR.
Geo. F. Haddican
BY
ATTYS

Patented May 17, 1949

2,470,308

UNITED STATES PATENT OFFICE 2,470,308

FITTING FOR FIBER PIPES

George F. Haddican, Delano, Calif.

Application January 3, 1947, Serial No. 719,998

1 Claim. (Cl. 285—210)

This invention relates to, and it is an object to provide, an improved connection fitting for fiber pipe such as is available for pipe lines for sewer, waste, or irrigation water or the like.

Under certain conditions it is desired to couple a length of fiber pipe to a metal connection fitting. However, the fiber pipe is manufactured with a tapered end and as conventional metal fittings have a straight bore in each end bell, coupling of these parts is not convenient and requires caulking, leading, or the like.

Thus, the present invention contemplates, and has for an object, the provision of a connection fitting, of cast iron or steel, especially adapted for coupling with tapered end fiber pipe; the connection fitting being formed with each end bell having a tapered bore to matchingly receive the tapered end portion of a length of fiber pipe therein, the connection being completed and sealed by a relatively thin layer of mastic between said engaged parts.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claim.

Figure 1:
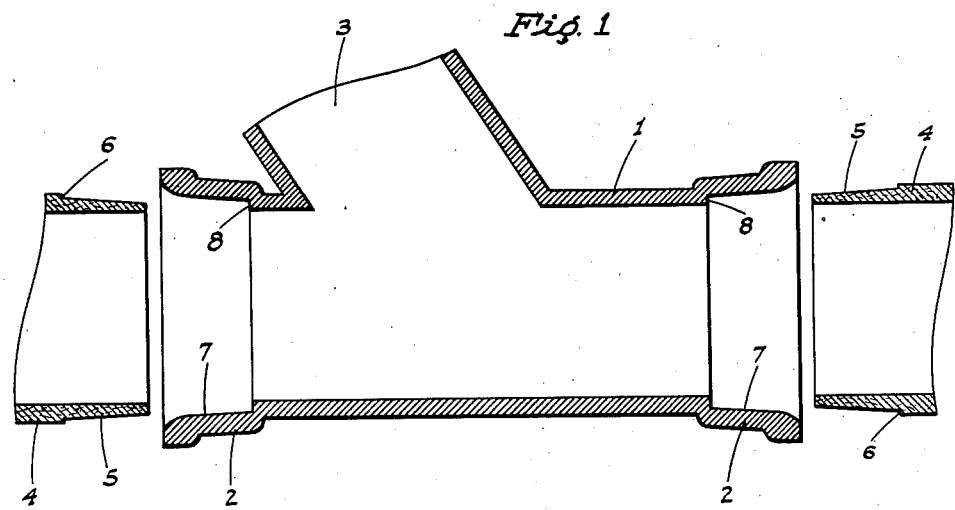
Fig. 1 is a sectional elevation of a cast metal connection fitting embodying the present invention; tapered end portions of lengths of fiber pipe being shown adjacent the end bells of the fitting, but before engagement in the latter.

Referring now more particularly to the characters of reference on the drawings, the numeral 1 illustrates a connection fitting of cast iron or steel; such connection fitting including—in the present illustration—opposite end bells 2 and a lateral 3. The fitting 1 may, however, be of any one of several types, but in each form includes at least one end bell 2.

As the connection with each end bell 2 is the same, a description of one will suffice, although a double-ended fitting is shown in Fig. 1.

The length of fiber pipe is indicated at 4, and includes, at one end thereof, a tapered end portion 5 whose inner end is defined by a radial external shoulder 6.

The corresponding end bell 2 of the cast metal fitting 1 is formed with a taper-bore 7; the taper of the end portion 5 of the fiber pipe 4, and the taper of the end bore 7, are such that these parts, when engaged, do so in matching relationship.

When the tapered end portion 5 of the fiber pipe 4 is matchingly engaged in the taper bore 7 of the end bell 2, the end of said portion 5 abuts against an internal, outwardly facing shoulder 8 in the bottom of said bell.

To complete the connection between the parts and to effectively seal the same, a relatively thin layer of mastic sealing compound, which layer is indicated at 9, is disposed between the adjacent surfaces of the matching parts.

Figure 2:
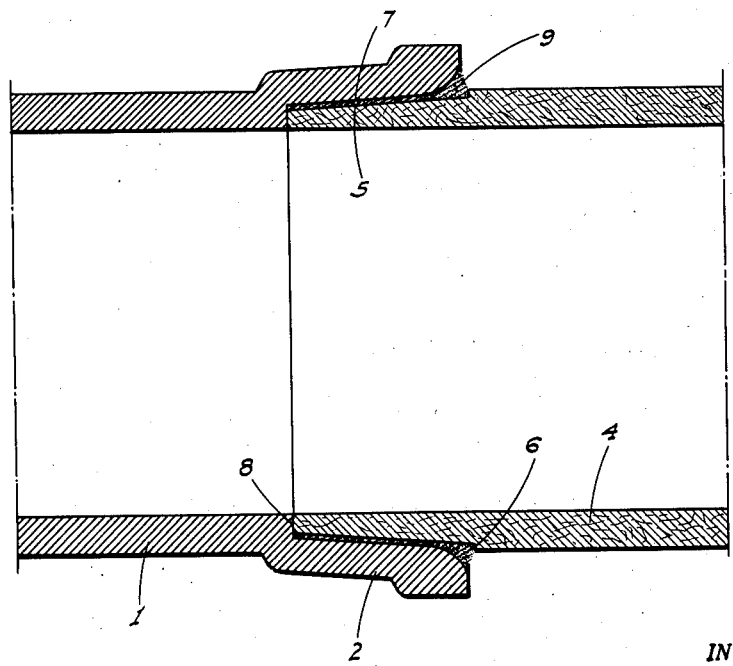
Fig. 2 is an enlarged sectional elevation showing one of said tapered end portions of the fiber pipe as engaged and sealed in the corresponding end bell of the cast metal fitting.

The mastic sealing compound is particularly effective when used between the cast metal fitting and fiber conduit because of the inherent porosity of each of said materials. Further, the external shoulder 6 is engaged by the thickened portion of the mastic, as shown in Fig. 2, and thus any tendency toward outward movement of the mastic 9 from between the opposed tapered walls of the fitting and conduit is thereby retarded.

With a cast metal fitting formed as described, it is possible to couple fiber pipe with such metal fitting without the need of caulking, poured lead seal, or other relatively difficult to install and expensive sealing being employed between the engaged parts. With a cast metal fitting embodying the present invention, fiber pipe may be connected thereto readily, quickly, and with an inexpensive seal in the form of the mastic layer therebetween.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent are desired:

In a fitting for coupling together a metal bell portion and a fiber conduit comprising, in combination, a tubular cast metal fitting having an outwardly flared free end bell portion, said bell portion being formed internally with an outwardly facing shoulder disposed perpendicular to the longitudinal axis of the bell portion and disposed inwardly a predetermined distance from the rim of the mouth of the bell, the internal wall of the bell defining the bell portion of the fitting being tapered outwardly from the surface of said shoulder, said rim around the inner periphery of the mouth of the bell portion being rounded outwardly and a fiber conduit having a circumferential forward facing external shoulder positioned inwardly from the free end thereof a distance greater than the distance from the internal shoulder in the bell portion, to thereby extend beyond the free rounded end at the mouth of the bell portion, said fiber conduit having its free end portion outwardly of the forwardly facing shoulder exteriorly tapered to correspond to the angle of taper of the tapered internal wall of the bell portion, said fiber conduit having its free end formed with a flat edge rim surface disposed perpendicular to the longitudinal axis of the said conduit in flush abutting contact with the said outwardly facing shoulder in the bell portion, whereby the external shoulder of the fiber conduit is positioned and spaced outside the mouth of the bell portion adjacent the rounded inner periphery of the bell mouth when said flat edge rim surface of the fiber conduit and said outwardly facing shoulder in the bell portion are in abutting contact.

GEORGE F. HADDICAN.

REFERENCES CITED

The following references are of record in the file of this patent:

UNITED STATES PATENTS

| Number | Name | Date |
| --- | --- | --- |
| 825,589 | Dixon | July 10, 1906 |
| 1,240,287 | Woodward | Sept. 18, 1917 |
| 1,940,579 | Burtnett | Dec. 19, 1933 |
| 2,219,289 | Bennett | Oct. 29, 1940 |
| 2,272,194 | Frances | Feb. 10, 1942 |
| 2,322,587 | Payne | June 22, 1943 |